(12) United States Patent
Fröhlich

(10) Patent No.: US 12,226,717 B2
(45) Date of Patent: Feb. 18, 2025

(54) SUPPORTING DEVICE AND METHOD OF MANUFACTURING

(71) Applicant: HAVER & BOECKER OHG, Oelde (DE)

(72) Inventor: Helmut Fröhlich, Oelde (DE)

(73) Assignee: HAVER & BOECKER OHG, Oelde (DE)

( * ) Notice: Subject to any disclaimer, the term of this patent is extended or adjusted under 35 U.S.C. 154(b) by 850 days.

(21) Appl. No.: 17/149,091

(22) Filed: Jan. 14, 2021

(65) Prior Publication Data

US 2021/0229005 A1 Jul. 29, 2021

(30) Foreign Application Priority Data

Jan. 29, 2020 (DE) .......................... 102020102069.4

(51) Int. Cl.
B01D 29/13 (2006.01)
(52) U.S. Cl.
CPC ...... B01D 29/13 (2013.01); *B01D 2201/0423* (2013.01)
(58) Field of Classification Search
None
See application file for complete search history.

(56) References Cited

U.S. PATENT DOCUMENTS 5,624,560 A 4/1997 Voll et al.

OTHER PUBLICATIONS

Office Action received in Israel Application No. 279671, dated Aug. 22, 2023.
Qiuyu, Y. et al., "Study on creating the three-dimensional shape of apparel by thermal bonding of thermoplastic polyurethane film and vacuum forming molding," Journal of Engineered Fibers and Fabrics, vol. 15, 2020, pp. 1-9.
Search Report received in German Application No. 10 2020 102 069.4 dated Jun. 12, 2020.
Haver & Boecker, "Woven Wire Cloth: Terminology, Types of Weave and Apertures," 2002, Haver & Boecker Wire Weaving and Engineering Works, http://www.haverboecker.com/en/downloads/, Oelde, Germany, 8 pages.
Haver & Boecker, "Filters and Fabricated Parts. Perfection in Detail," 2018, Haver & Boecker Filters and Fabricated Parts, http://www.haverboecker.com/en/downloads/, Oelde, Germany, 16 pages.

*Primary Examiner* — Arti Singh-Pandey
(74) *Attorney, Agent, or Firm* — Greer, Burns & Crain, Ltd

(57) ABSTRACT

A supporting device for a filter device including a flat-woven material manufactured of warp devices and weft devices, which form a woven surface, wherein the flat-woven material shows, in two opposite end portions, two free ends of warp devices or weft devices protruding from the woven surface. The flat-woven material is shaped to form a predetermined three-dimensional shape with a free cross-section, and the free ends overlap and are interconnected. The present method provides for shaping the flat-woven material around a molding part until the free ends of the two end portions overlap. The ends are interconnected. A filtering device accordingly includes a supporting device and a filter device.

18 Claims, 5 Drawing Sheets

SUPPORTING DEVICE AND METHOD OF MANUFACTURING

BACKGROUND

The present invention relates to a supporting device for at least one filter device, comprising at least one flat-woven material manufactured of warp devices and weft devices, which form at least one woven surface. The flat-woven material shows, in at least two opposite end portions, at least two free ends of warp devices or weft devices protruding from the woven surface. Moreover, the present invention relates to a method of manufacturing such a supporting device, and a filtering device having such a supporting device, and at least one filter device.

The field of filter technology and screening technology is extremely extensive and diverse. A plurality of different filters and screens has been disclosed in the prior art. The present invention may be employed in, respectively transferred to, any of these fields.

For example, filters are used in a variety of fields e.g. for water treatment. The requirements for these filters as regards the flow rate, the stability in terms of the pressure employed, and the durability, may extremely differ between applications.

One application indicated just exemplarily for illustrating the invention are, the ballast water tanks or intermediate bottoms for ballast water of container ships, which are filled up with more or less water in relation to the load of the container ship, to always guarantee a suitable immersion.

In order to avoid the mixing of water and transfer of animals, plants, bacteria, fungi etc. from the water of a harbor with the water in a harbor, in particular in discharging ballast water, at least one coarse filter, one fine filter, and UV purification are as a rule provided. The filters employed are very large to exchange a sufficient quantity of water within a suitable time.

These filters may show diameters for example of 400 mm and a relatively great length. These tube-like filters comprise, because of the very high pressures of usually 5 to 6 bars, a stable filter cage to sufficiently support a filter.

These filter cages tend to be made of perforated plates bent to a tubular shape and welded. These perforated plates, however, involve a relatively high quantity of material and relatively high material waste. Moreover, the free flow cross-section is relatively narrow. Fine bar screens are relatively complicated in manufacture. All the filter cages require a highly precise fit between the filter cage and the filter. With fine bar screens and, also with perforated plates this is relatively difficult.

SUMMARY

It is therefore the object of the present invention to provide a filter cage which is comparatively low-cost in manufacturing and enables a particularly advantageous fit of a filter in the filter cage.

The supporting device according to the invention for at least one filter device comprises at least one flat-woven material manufactured from warp devices and weft devices. The warp devices and the weft devices form at least one woven surface. In at least two opposite end portions, the flat-woven material comprises at least two free ends of warp devices or weft devices protruding from the woven surface. The flat-woven material is shaped to form a predetermined three-dimensional shape, with at least one free cross-section, so that only the free ends overlap at least in sections and the ends are interconnected.

Preferably two ends each are interconnected. In particular, if only one woven mesh is used, the two ends belong to a weft device respectively warp device that is preferably continuous. In the case of multiple woven meshes, respectively woven mesh portions, which together form the required woven surface, the ends of the various woven meshes may preferably be interconnected.

The supporting device is in particular configured as a supporting cage respectively filter cage or a supporting cylinder respectively a filter cylinder. In particular, the supporting device is configured so that at least one filter device disposed inside the supporting device is supported by the supporting device, for example while water is guided through the filter device in particular at high pressures.

The supporting device, respectively the flat-woven material, is in particular shaped three-dimensionally, so that the woven mesh forms a hollow space, respectively a takeup space, respectively a basket-like respectively substantially tubular product, for the at least one filter device. Then, the filter device is preferably likewise configured substantially tubular respectively basket-like.

Then, the free ends of the weft devices respectively warp devices are interconnected, in particular in the peripheral direction of the three-dimensional shape, respectively the basket-like respectively tubular object, so as to permanently provide just this three-dimensional shape of the supporting device.

The filter device according to the invention preferably supports internal or external filter devices, depending on the configuration and application.

The supporting device according to the invention offers many advantages. It is a considerable advantage that by connecting the free ends, a filter cage, respectively filter cylinder, respectively a supporting cylinder, respectively a supporting cage is manufactured, distinguished by very high stability combined with a relatively small quantity of material.

The supporting device according to the invention can be employed independently of the applications indicated only exemplarily in the present application, in any field of filter technology and/or screening technology.

Due to the fact that only the free ends overlap and that there is no overlap of complete mesh layers of weft and warp wires, a particularly precise fit can be achieved since the mesh surface is always in one layer.

The warp devices and weft devices are, in particular configured respectively dimensioned so as to offer sufficient stability for the application concerned. Thus, for example wires showing a cross-section of cage, 4 mm may be used for warp devices and/or weft devices. Generally, a round configuration of the warp devices and/or weft devices is preferred.

Employing a woven layer provides a two-dimensional support for the filter device. Thus, relatively large filter cages, respectively supporting devices may be manufactured, which can withstand high pressures of multiple bars. Thus, for example filter cages showing a diameter of e.g. 400 mm may be manufactured, which withstand pressures of 5 to 6 bars, as it is e.g. required in filters for ballast water of container ships.

In particular, the supporting device according to the invention allows bending respectively from the flat-woven material to such a shape wherein the supporting device is only completed by connecting the free ends, as optimal contact with a molding part is given, which preferably corresponds to the shape respectively the dimensions of a filter device intended for later use. Thus, the lowest possible tolerances, and particularly snug fit of the filter device to the supporting device is enabled.

In order to guarantee a particularly good contact of the filter device with the supporting device, respectively the supporting cage, the free cross-section of the supporting device is preferably matched to the cross-section of a filter device intended for use respectively subsequent insertion.

A substantially cylindrical shape is particularly preferred. A particularly stable and suitable three-dimensional shape can be achieved in particular by means of a round and/or roundish cross-section.

Preferably, the free ends overlap in a plane. Thus, it is achieved that no inwardly protrusion is given into the free cross-section, which would impede a planar contact of the filter device with the supporting device.

In advantageous specific embodiments, the flat-woven material is configured as a wire mesh. Then, the weft devices are preferably configured as weft wires and the warp devices in particular, as warp wires. Such a wire mesh can preferably be configured as a pure wire mesh, and/or it may be configured as a mixed mesh. Suitable plastics and/or composite materials may, in particular, be used as weft devices, respectively weft wires and/or warp devices, respectively warp wires.

Preferably, the flat-woven material is configured, at least in sections and in particular entirely, as an oblong woven mesh. The use of oblong meshes provides particularly large, though stable meshes in the woven mesh.

The oblong meshes preferably extend in the peripheral direction. This achieves a particularly precise match, respectively shaping of the supporting device.

Preferably, the free ends are welded, glue-bonded, sintered, joined with one another and/or interconnected by means of at least one connecting member. A stable and permanent connection is, in particular preferred. The connecting members employed may be, depending on the configuration, for example suitable shrink tubes or other elements, for example latching elements.

Preferably, the flat-woven material is woven and/or processed such that the inside surface of the flat-woven material is substantially plane. The inside surface of the flat-woven material is, in particular, understood to mean that side of the woven mesh contacting the filter device. In the case of a filter disposed externally, this would be the side of the supporting device facing outwardly. To obtain a smooth or plane surface respectively close fit of the filter device, for example, the warp wires and/or weft wires of a wire mesh may be processed respectively reshaped, so that the intersecting points between weft wires and warp wires are reshaped outwardly respectively toward the side of the woven surface facing away from the filter.

Preferably, the overlapping of at least two warp devices or weft devices lies on top of one another in the axial extension. In particular, all of the connections between the free ends are disposed on top of, respectively beneath, one another respectively in a row.

Depending on the configuration, it is preferred for the overlapping of at least two warp devices or weft devices to be staggered to one another in the axial extension. The connections may, in particular, run diagonally.

Preferably, the base surface, respectively, the starting surface prior to reshaping the flat-woven material, is substantially rectangular, square, or parallelogram-like. When connecting the free ends of a square or rectangular woven mesh portion, the connections preferably come to lie in a row respectively on top of one another. In the case of a parallelogram-like shape of the flat-woven material, the connections of the free ends preferably run substantially diagonally.

The connection of the free ends is preferably processed. Thus, for example when welding the ends together, post-processing the weld seam may be useful. For example, sealing and/or deoxidizing may be advantageous.

In useful configurations, at least two flat-woven materials are provided, wherein the ends of the flat-woven materials are interconnected. In this configuration, several woven mesh portions are interconnected to obtain the desired woven surface.

The method of manufacturing a supporting device, in particular as described above, is characterized by the following steps in suitable sequence and number. At least one flat-woven material is manufactured and/or prepared. Thus, a suitable flat-woven material may in particular be manufactured directly, or for example fetched from a storage. The flat-woven material is reshaped around at least one molding part showing a predetermined three-dimensional shape, until the two ends of at least two weft devices or warp devices extending around the molding part in the peripheral direction overlap at least in sections in the two end portions of the flat-woven material. The pertaining ends of the weft devices or warp devices are interconnected.

The flat-woven material is, in particular, shaped around the molding part in a very snug fit, to then guarantee an optimal, close fit of a correspondingly shaped filter device.

The overlapping of the ends is preferably provided in a plane, so as to provide for a linear, plane and flat contact including in the one or more interconnect point(s).

The method according to the invention achieves the advantageous properties of the supporting device according to the invention.

In a configuration in which the supporting device supports an external filter device, the flat-woven material can preferably be inserted in a hollow mold corresponding to the filter device and matched to the contour of the hollow mold, until the free ends overlap for making the connection.

After connecting the ends, the molding part is preferably removed from the free cross-section thus formed of the supporting device. At least one filter device with a suitable shape can later be inserted into this free cross-section.

Particularly preferably, the flat-woven material is suitably cut to shape and size in the following step. Thus, a woven mesh portion in a suitable shape and size can be preferably cut out of a mesh web. Depending on the configuration, this woven mesh portion is then preferably immediately processed further, or processing steps may be provided to provide the free ends in a suitable quantity and length.

In expedient specific embodiments, the flat-woven material is tensioned in a suitable spot. Tensioning the woven mesh around the molding part is preferred. Thus, tensioning prior to connecting the ends results in a woven mesh having a particularly snug fit against the molding part. This may be achieved, for example, by means of one or more tensioning straps or by other suitable tensioning means.

In the case that an external filter device is provided, the woven mesh may alternately, preferably also be tensioned respectively pressed outwardly.

The filtering device according to the invention comprises at least one supporting device as described above and at least one filter device.

The filtering device according to the invention also offers the advantages described above. The fact that the filter device bears against the supporting device particularly planar, exact and close fitting, provides for better durability of the filtering device. Moreover, the specific configuration of the supporting device establishes a particularly optimum support for a filter device. A flat woven mesh may be employed, which is then subjected to a particularly advantageous shaping. Thus, compared to perforated plates or fine bar screens, an optimally snug-fitting supporting device can be provided which involves considerably reduced quantities of material.

BRIEF DESCRIPTION OF THE DRAWINGS

Further advantages and features of the present invention can be taken from the exemplary embodiments which will be discussed below with reference to the enclosed figures.

The figures show in.

DETAILED DESCRIPTION

Figure 1:
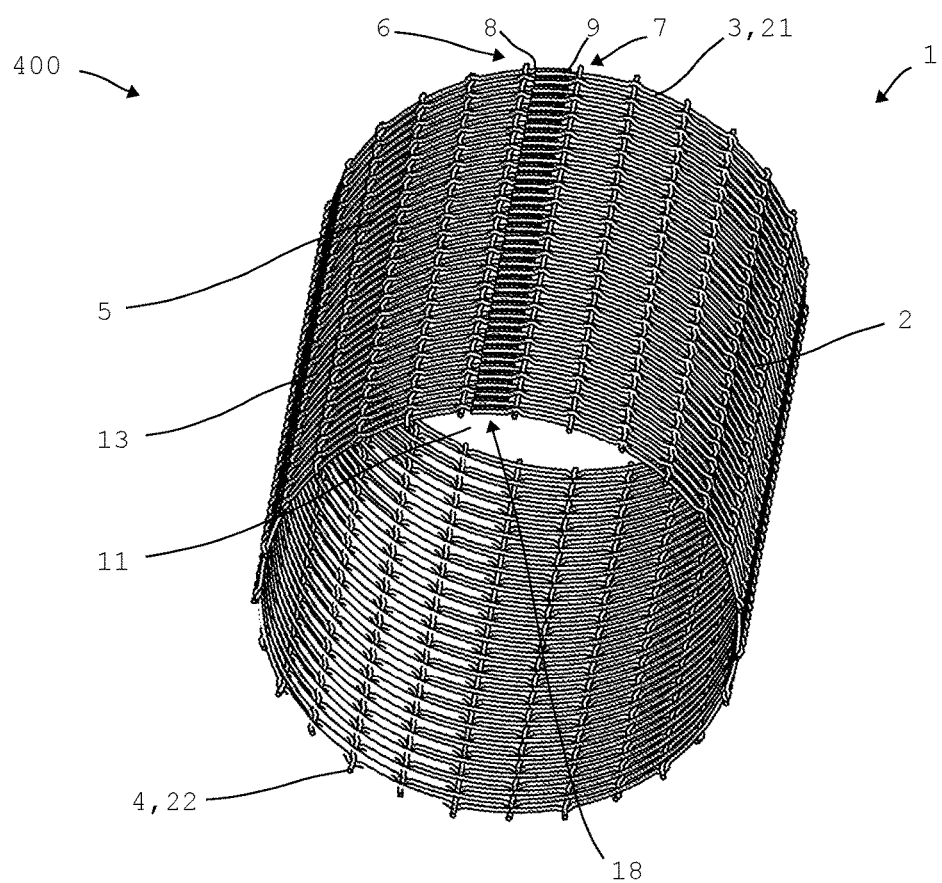
FIG. 1 a schematic illustration of an exemplary embodiment of a supporting device according to the invention in a perspective view.

FIG. 1 schematically illustrates an exemplary embodiment of a supporting device 1 according to the invention in a perspective view. In the exemplary embodiment shown, the supporting device 1 provides a supporting cage 400 of a wire mesh 13.

The supporting device 1 comprises a flat-woven material, presently configured as an oblong woven mesh 14. The warp devices 3 and weft devices 4 or in this case, the warp wires 21 and weft wires 22, form a woven surface.

The flat-woven material 2 respectively the woven surface 5 is bent over so as to form a three-dimensional shape 10 with a free cross-section 11. This free cross-section 11 accommodates a filter device 100. A round cross-section 10 is provided so that the supporting device 1 respectively the filter cage 400 is configured cylindrically.

For the flat-woven material 2 to maintain its cylindrical shape, the flat-woven material 2 comprises at the end portions 6, 7, free ends 8, 9, which during reshaping to the cylindrical shape make contact with one another and are connected with an overlap. In the shown supporting device 1 of a wire mesh 13, the ends 8, 9 are welded to one another. Thereafter, the welding seams were deoxidized and sealed.

The use of wire mesh, presently with warp wires 21 and weft wires with a diameter of 4 mm, provides a very stable supporting cage 400. Since the flat-woven material 2 is first shaped around a molding part 300 and only thereafter connected, very narrow tolerances can be achieved.

Figure 2:
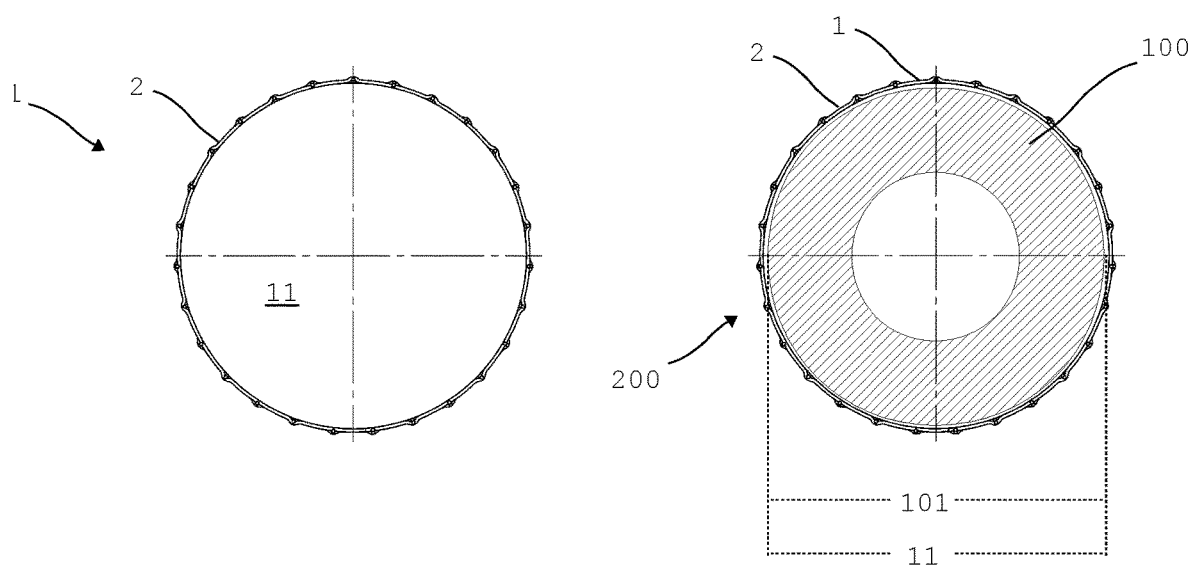
FIG. 2 schematic illustrations of the exemplary embodiment according to FIG. 1 in side views with and without filter device.

FIG. 2 schematically shows on the left, a view of the free cross-section 11 of the cylindrical supporting cage 400.

On the right, the same view is shown of a filtering device 200 according to the invention with an inserted filter device 100. It can be seen that the free cross-section 11 of the supporting device 1 is matched to the cross-section 101 of the filter device 100.

Figure 3:
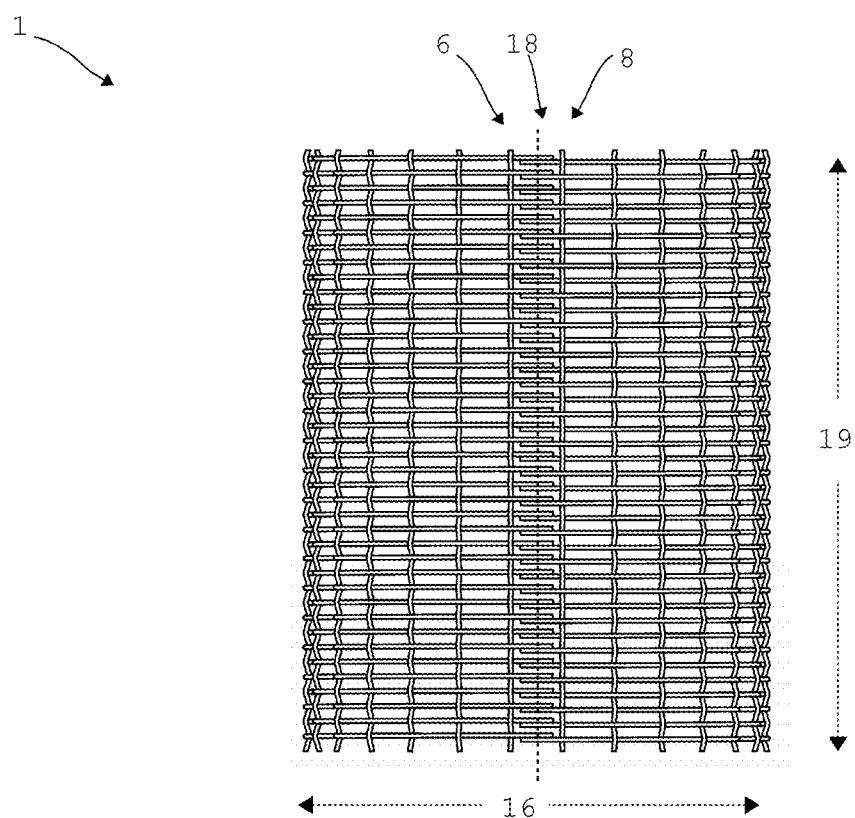
FIG. 3 a schematic illustration of the exemplary embodiment according to FIG. 1.

FIGS. 3 and 4 show a schematic plan view of the exemplary embodiment described above, FIG. 4 illustrating an enlarged region.

The flat-woven material 2 can be seen, configured as a wire mesh 13 with warp wires 21 and weft wires 22, which form oblong meshes 15. These oblong meshes 15 are disposed in the peripheral direction 15.

The oblong meshes 15, respectively the use of an oblong woven mesh 14 results in a supporting device 1 having very good stability while involving very small quantities of material and a large, free flow cross-section of the woven mesh.

Figure 4:
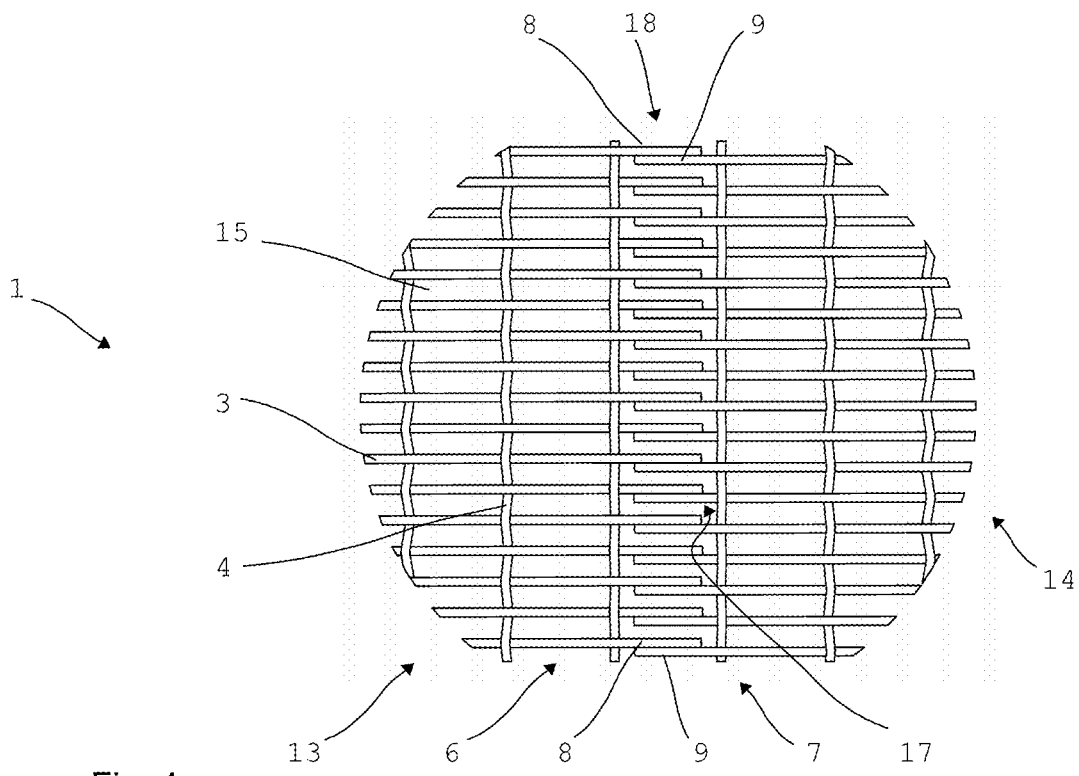
FIG. 4 a schematic, enlarged illustration of an area of the exemplary embodiment according to FIG. 3.

In particular, in FIG. 4 one can see the overlapping 18 of the free ends 8, 9 of the end portions 6, 7 of the woven surface 5 respectively of the flat-woven material 2 respectively of the wire mesh 13.

In the exemplary embodiment illustrated, a rectangular basic shape 20 of the woven surface 5 respectively of the flat-woven material has been used. Therefore, the overlappings 18 are disposed on top of one another in the axial extension, respectively in one line.

The ends 8, 9 are disposed on a plane, presently adjacent to one another, so that the inside surface 17 of the supporting device 1 is smooth and as planar as possible.

In order to obtain sufficient stability of the filter cage 400, the ends 8, 9 are welded to one another. In other configurations, other suitable types of connection are possible, such as gluing, plugging, sintering, joining, connecting with connecting members or the like.

Figure 5:
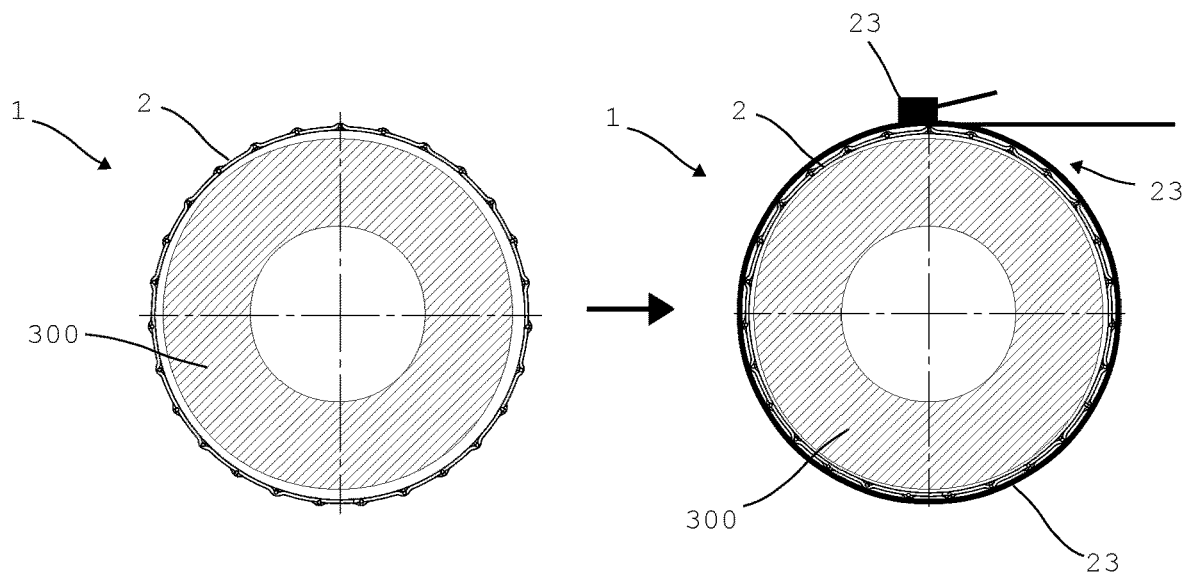
FIG. 5 a schematic illustration of manufacturing steps of an exemplary embodiment of a supporting device according to the invention.

FIG. 5 schematically illustrates the reshaping and connecting of the flat-woven material 2 to obtain a supporting device 1.

The flat-woven material 2 is shaped around a molding part 300, so that the free ends 8, 9 of the end portions 6, 7 make contact with one another. The molding part corresponds to the shape of the filter device 100 intended for later insertion.

To subsequently guarantee a highly precise contact of the supporting cage 400 with the filter device 100, the flat-woven material 2 is tensioned around the molding part prior to connecting the free ends 8, 9. This is done by way of a tensioning device 12 comprising a number of tensioning straps 23 in the exemplary embodiment shown. Thus, an optimal contact of the flat-woven material with the molding part and thus subsequently, a minimal tolerance as regards the filter device 100 can be achieved.

Following the final connection of the ends 8, 9, the tensioning straps 23 respectively the tensioning device 12 can be detached and the molding part 400, removed.

Figure 6:
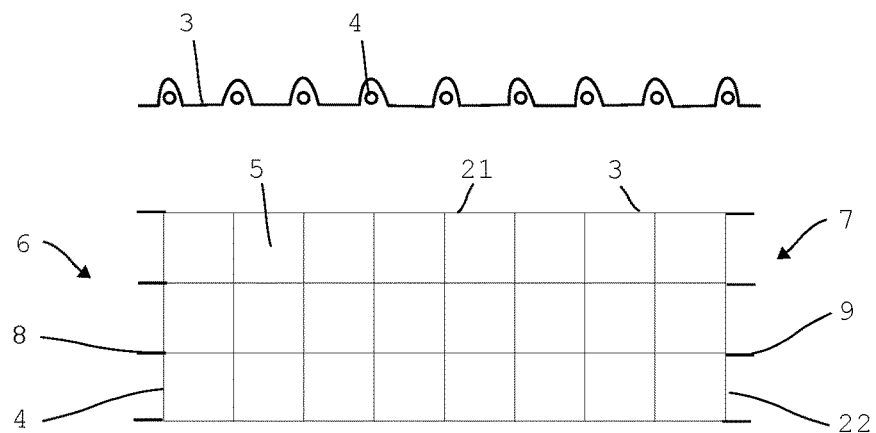
FIG. 6 a schematic illustration of the base surface of a flat-woven material for a supporting device according to the invention.

FIG. 6 schematically illustrates a flat-woven material 20 showing a rectangular base surface 20. A rectangular basic shape 200 of about the same type has been used in the exemplary embodiment shown above.

One can recognize the end portions 6, 7 with the free ends of the warp devices 3, which are cylindrically shaped approaching one another for forming the supporting device 1.

The sectional view on top depicts that the wire mesh 13 is woven such that the inside surface 17 of the flat-woven material 17 respectively the supporting device 1 is planar, so that even the crossing points of the warp devices 3 and weft devices 4 do not form any protrusions which would impede a planar respectively linear, close fit of the filter device 100 in the supporting cage 400.

Figure 7:
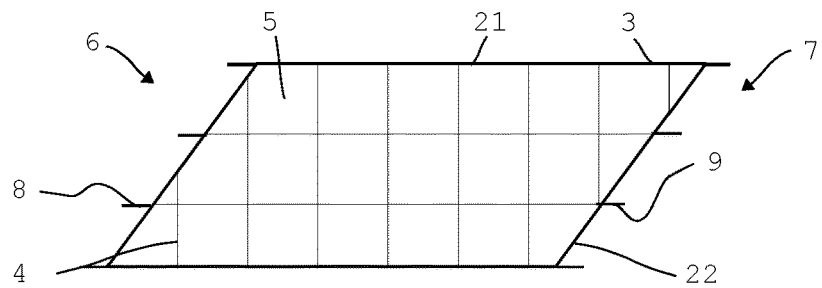
FIG. 7 a schematic illustration of another base surface of a flat-woven material for a supporting device according to the invention.
Figure 8:
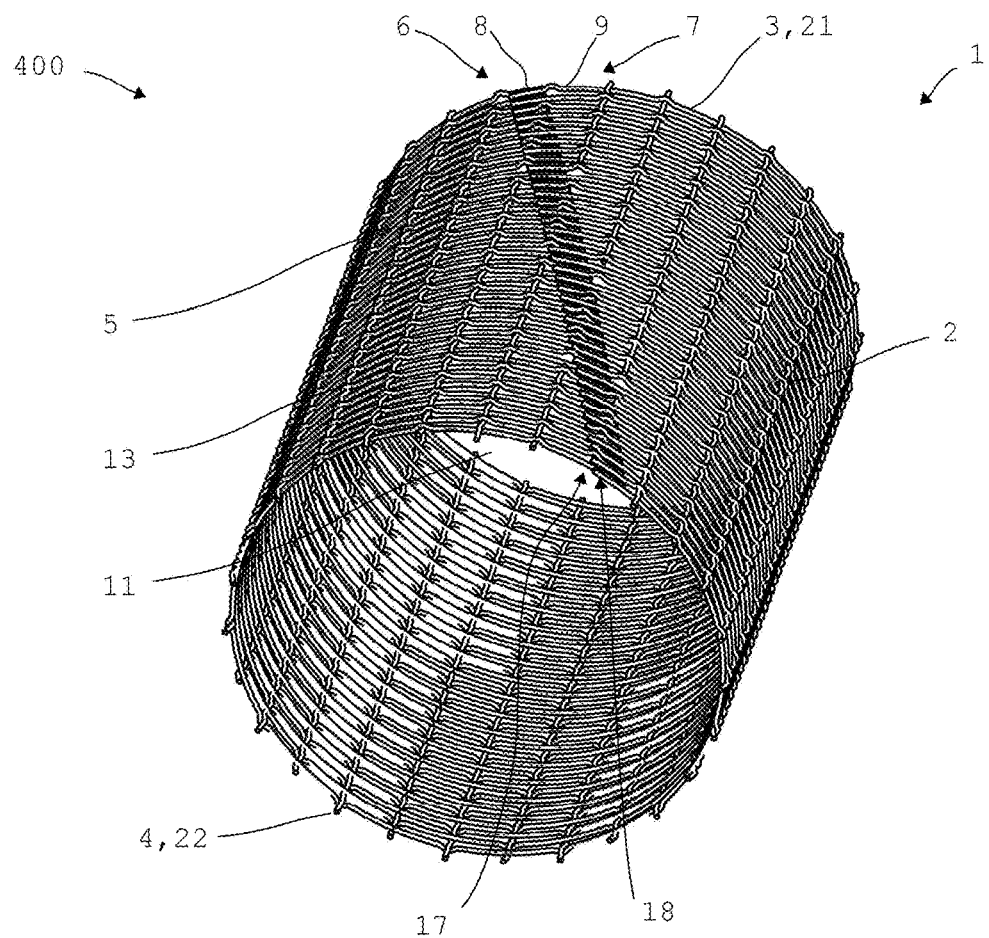
FIG. 8 a schematic illustration of another exemplary embodiment of a supporting device according to the invention in a perspective view.
Figure 9:
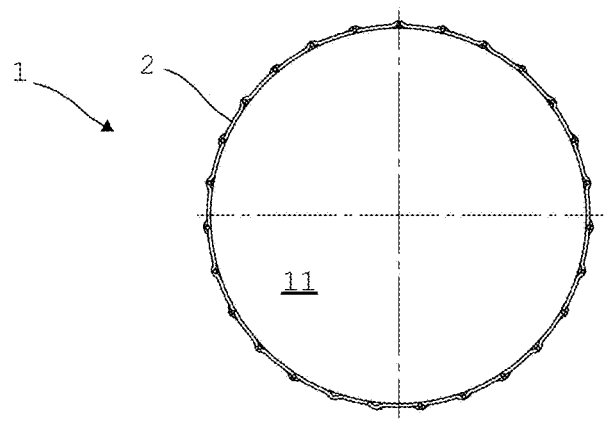
FIG. 9 a schematic illustration of the exemplary embodiment according to FIG. 8 in a side view.
Figure 10:
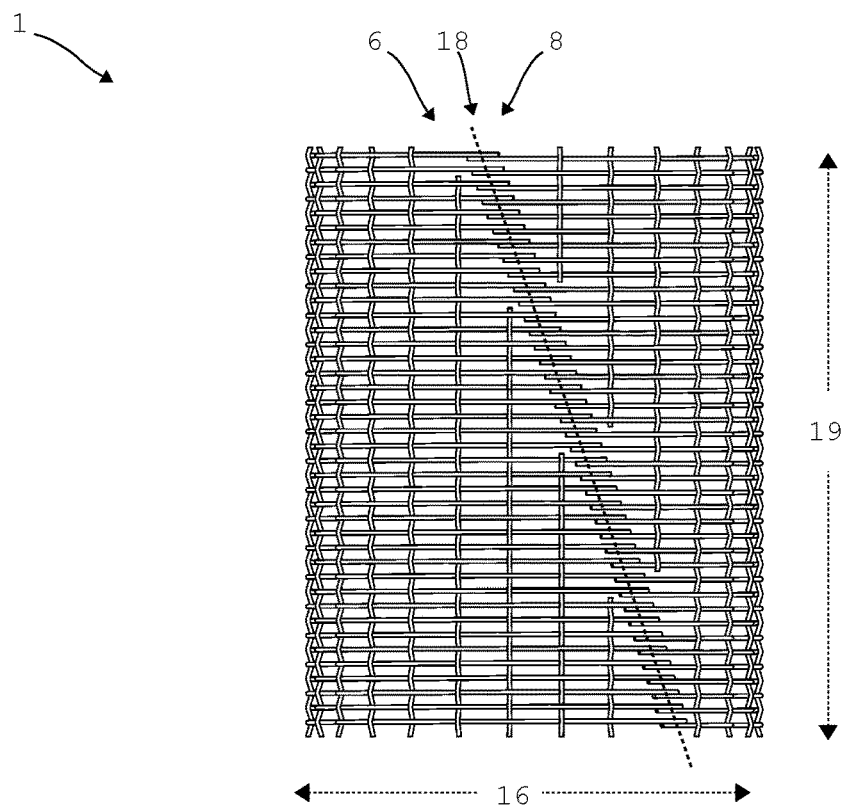
FIG. 10 a schematic illustration of the exemplary embodiment according to FIG. 8 in a plan view.
Figure 11:
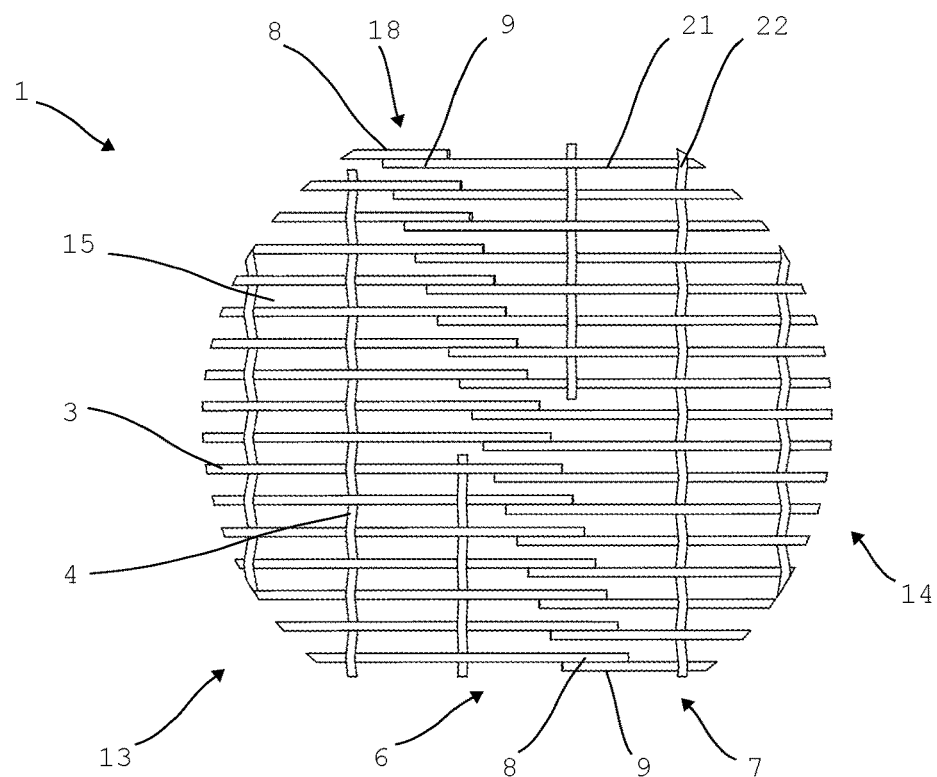
FIG. 11 a schematic, enlarged illustration of an area of the exemplary embodiment according to FIG. 10.

FIG. 7 schematically illustrates a flat-woven material in a parallelogram-like basic shape. Approximately such a basic shape 20 was used for the exemplary embodiment described below.

The FIGS. 8 to 11 schematically show another exemplary embodiment of a supporting device 1 according to the invention in various views.

The structure is basically the same as provided in the exemplary embodiment shown above. However, unlike the embodiment described above, a parallelogram-type, basic shape 20 of the flat-woven material 2 is provided.

The result thereof is that after reshaping, the free ends 8, 9 are not disposed in one line in the axial extension but staggered. The overlapping 18 extends diagonally from the top left to the bottom right. Depending on the configuration, this configuration of overlapping may show different properties as to stability.

While a particular embodiment of the present supporting device and method of manufacturing have been described herein, it will be appreciated by those skilled in the art that changes and modifications may be made thereto without departing from the invention in its broader aspects and as set forth in the following claims.

LIST OF REFERENCE NUMERALS 1 wire mesh layer
2 flat-woven material
3 warp devices
4 weft devices
5 woven surface
6 end portion
7 end portion
8 free end
9 free end
10 shape
11 cross-section
12 tensioning device
13 wire mesh
14 oblong woven mesh
15 oblong meshes
16 peripheral direction
17 inside surface
18 overlapping
19 axial extension
20 base surface
21 warp wire
22 weft wire
23 tensioning strap
100 filter device
101 cross-section
200 filtering device
300 molding part
400 supporting cage

The invention claimed is:

1. A supporting device for at least one filter device, comprising: at least one flat-woven material, which comprises warp devices and weft devices, which form at least one woven surface; wherein the flat-woven material shows, in at least two opposite end portions; at least two free ends of warp devices or weft devices protruding from the woven surface; and
the flat-woven material is shaped to form a predetermined, three-dimensional shape with at least one free cross-section, so that only the free ends overlap at least in sections, wherein the free ends overlap in a plane, and that the ends are interconnected.

2. The supporting device according to claim 1, wherein the free cross-section is matched to the cross-section of a filter device intended for use.

3. The supporting device according to claim 1, wherein the three-dimensional shape is substantially cylindrical.

4. The supporting device according to claim 1, wherein the flat-woven material is configured as a wire mesh.

5. The supporting device according to claim 1, wherein the flat-woven material is configured as an oblong woven mesh at least in sections.

6. The supporting device according to claim 5, wherein the oblong meshes extend in the peripheral direction.

7. The supporting device according to claim 1, wherein the free ends are welded, glue-bonded, sintered, joined with one another and/or interconnected by means of at least one connecting member.

8. The supporting device according to claim 1, wherein the flat-woven material is woven such that the inside surface of the flat-woven material is substantially planar.

9. The supporting device according to claim 1, wherein the overlapping of at least two warp devices or weft devices lie on top of one another in the axial extension.

10. The supporting device according to claim 1, wherein the overlapping of at least two warp devices or weft devices are staggered to one another in the axial extension.

11. The supporting device according to claim 1, wherein the base surface of the flat-woven material is substantially rectangular, square, or parallelogram-like.

12. The supporting device according to claim 1, wherein the connection of the free ends is processed.

13. The supporting device according to claim 1, wherein at least two flat-woven materials are provided and the ends of the flat-woven materials are interconnected.

14. A filtering device, comprising at least one supporting device according to claim 1, and at least one filter device.

15. A method of manufacturing a supporting device according to claim 1, comprising the following steps in suitable sequence:
creating and/or preparing at least one flat-woven material;
reshaping the flat-woven material around at least one molding part (300) showing a predetermined three-dimensional shape, until the ends of at least two weft devices or warp devices extending around the molding part (300) in the peripheral direction (16) overlap at least in sections in the two end portions (6, 7) of the flat-woven material; and
connecting the pertaining ends of the weft devices or warp devices.

16. The method according to claim 15, characterized by the following step in a suitable position:
cutting the flat-woven material to shape and size.

17. The method according to claim 15, characterized by the following step in a suitable position:
tensioning the flat-woven material around the molding part.

18. The method according to claim 16, characterized by the following step in a suitable position:
   removing the molding part.

\* \* \* \* \*